United States Patent
Dailly

(10) Patent No.: US 10,491,600 B2
(45) Date of Patent: Nov. 26, 2019

(54) METHOD OF CONTROLLING ACCESS TO A RESERVE ZONE WITH CONTROL OF THE VALIDITY OF AN ACCESS ENTITLEMENT INSTALLED IN THE MEMORY OF A MOBILE TERMINAL

(71) Applicant: THALES, Courbevoie (FR)

(72) Inventor: Philippe Dailly, Bretigny-sur-Orge (FR)

(73) Assignee: THALES, Courbevoie (FR)

( * ) Notice: Subject to any disclaimer, the term of this patent is extended or adjusted under 35 U.S.C. 154(b) by 364 days.

(21) Appl. No.: 15/124,423

(22) PCT Filed: Mar. 3, 2015

(86) PCT No.: PCT/EP2015/054376
§ 371 (c)(1),
(2) Date: Sep. 8, 2016

(87) PCT Pub. No.: WO2015/135793
PCT Pub. Date: Sep. 17, 2015

(65) Prior Publication Data
US 2017/0019413 A1    Jan. 19, 2017

(30) Foreign Application Priority Data
Mar. 12, 2014   (FR) ..................................... 14 00597

(51) Int. Cl.
*H04L 29/06*          (2006.01)
*G06Q 20/32*          (2012.01)
(Continued)

(52) U.S. Cl.
CPC ......... *H04L 63/107* (2013.01); *G06Q 20/045* (2013.01); *G06Q 20/0457* (2013.01);
(Continued)

(58) Field of Classification Search
CPC ........................ H04L 63/107; H04L 2463/121
(Continued)

(56) References Cited

U.S. PATENT DOCUMENTS 6,347,338 B1 *   2/2002   Segal .................. H04L 63/0218
                                                    709/229
8,943,605 B1 *   1/2015   Martin ..................... H04W 4/70
                                                     726/27
(Continued)

FOREIGN PATENT DOCUMENTS

EP           1276081 A2       1/2003
EP           1772986     * 10/2006  ............... H04L 9/32
(Continued)

OTHER PUBLICATIONS

Kellerer, "A Communication Gateway for Infrastructure-Independent 4G Wireless Access", Mar. 2002, IEEE, pp. 126-131 (Year: 2002).*

(Continued)

*Primary Examiner* — Kenneth W Chang
*Assistant Examiner* — Gregory A Lane
(74) *Attorney, Agent, or Firm* — Perne & Gordon LLP

(57) ABSTRACT

The method comprises the following steps: presentation of a mobile terminal to an access control point, capture of an image carried by the access control point, and representative of an encoded item of computer data, by a camera of the terminal, and decryption, by the terminal of the of the image captured by the camera, so as to deduce therefrom the encoded item of computer data, which is a unique identifier of the access control point, by the mobile terminal, by the unique identifier of the access control point decrypted, transmission to the access control point broadcast, by the mobile terminal, of an entitlement for access to the reserve zone, which entitlement is stored in its memory, via the (Continued)

Figure 1:
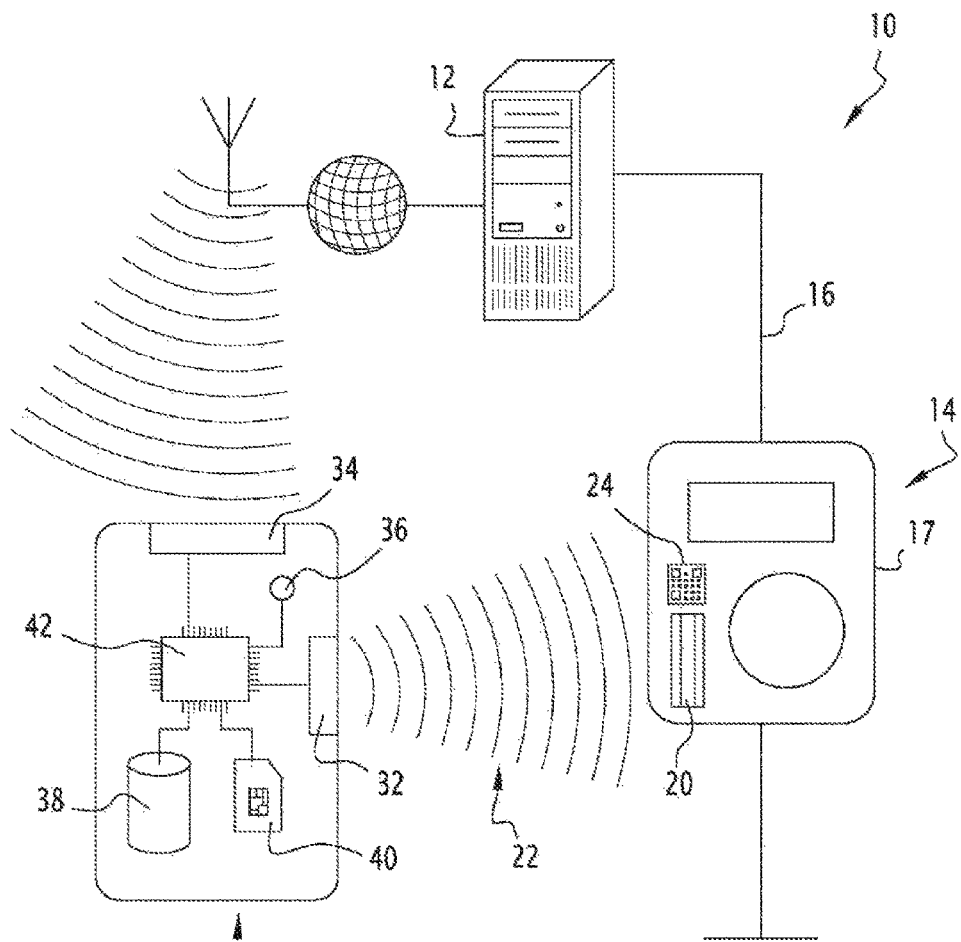

wireless connection, and control of the validity of the data of the access entitlement by the access control point.

14 Claims, 5 Drawing Sheets

(51) Int. Cl.
 G06Q 20/40 (2012.01)
 G07B 15/02 (2011.01)
 G07C 9/00 (2006.01)
 H04W 12/08 (2009.01)
 G06Q 20/04 (2012.01)
 G06Q 20/10 (2012.01)
 H04W 12/00 (2009.01)

(52) U.S. Cl.
 CPC ......... *G06Q 20/10* (2013.01); *G06Q 20/3278* (2013.01); *G06Q 20/40* (2013.01); *G07B 15/02* (2013.01); *G07C 9/00007* (2013.01); *H04W 12/003* (2019.01); *H04W 12/08* (2013.01); *H04L 2463/121* (2013.01); *H04W 12/00502* (2019.01); *H04W 12/00503* (2019.01); *H04W 12/00522* (2019.01)

(58) Field of Classification Search
 USPC .......................................................... 726/7
 See application file for complete search history.

(56) References Cited

U.S. PATENT DOCUMENTS

| | | | |
|---|---|---|---|
| 2002/0043566 A1 | 4/2002 | Goodman et al. | |
| 2005/0289095 A1* | 12/2005 | Rauhala | H04L 63/102 |
| 2006/0036863 A1 | 2/2006 | Miller et al. | |
| 2006/0268902 A1* | 11/2006 | Bonner | H04L 63/102 |
| | | | 370/401 |
| 2009/0022314 A1* | 1/2009 | Wada | G06K 17/00 |
| | | | 380/246 |
| 2009/0064346 A1* | 3/2009 | Larsson | H04L 63/0807 |
| | | | 726/29 |
| 2010/0154049 A1* | 6/2010 | Yoshimi | H04L 63/02 |
| | | | 726/13 |
| 2010/0246902 A1* | 9/2010 | Rowe | G06K 9/00033 |
| | | | 382/115 |
| 2010/0325427 A1* | 12/2010 | Ekberg | H04L 9/321 |
| | | | 713/156 |
| 2011/0081860 A1* | 4/2011 | Brown | H04N 1/00347 |
| | | | 455/41.3 |
| 2011/0208645 A1 | 8/2011 | Knauft et al. | |
| 2012/0278137 A1* | 11/2012 | Dixon | G06Q 20/322 |
| | | | 705/13 |
| 2012/0280784 A1* | 11/2012 | Gaviria Velez | H04M 1/72522 |
| | | | 340/5.7 |
| 2014/0022920 A1* | 1/2014 | Dua | H04W 4/021 |
| | | | 370/252 |
| 2015/0223016 A1* | 8/2015 | Webb | H04W 4/02 |
| | | | 455/456.1 |

FOREIGN PATENT DOCUMENTS

| | | |
|---|---|---|
| EP | 2306692 A1 | 4/2011 |
| GB | 2485442 A | 5/2012 |
| WO | 2008062179 A2 | 5/2008 |

OTHER PUBLICATIONS

Search Report for FR 14 00597 dated Oct. 31, 2014.
English translation of International Search Report for PCT/EP2015/054376 dated May 22, 2015.

\* cited by examiner

METHOD OF CONTROLLING ACCESS TO A RESERVE ZONE WITH CONTROL OF THE VALIDITY OF AN ACCESS ENTITLEMENT INSTALLED IN THE MEMORY OF A MOBILE TERMINAL

This application is a National Stage application of PCT international application PCT/EP2015/054376, filed on Mar. 3, 2015 which claims the priority of French Patent Application No. 14 00597, filed with the French Patent Office on Mar. 12, 2014, both of which are incorporated herein by reference in their entirety.

The present invention relates to a method of controlling access to a reserve zone via a system for controlling access to the reserve zone, the method comprising the following steps:

presenting a mobile terminal to an access control point of the access control system, capturing an image carried by the access control point, representative of an encoded item of computer data, using a camera of the mobile terminal, and decrypting, via the mobile terminal, the image captured by the camera, to deduce the encoded computer data therefrom.

Public transportation network operators generally equip their network with a system for controlling access to the public transportation network in order to ensure that users of their network are indeed authorized users who have paid a usage fee for the network. This access control system most often comprises access control points positioned at the entrance to the public transportation network, i.e., the entrance of vehicles of the network (buses, trams and subways) or the entrance of the loading platforms for said vehicles. These access control points are suitable for verifying that the user's transportation entitlement, which constitutes an access entitlement for the user to access the public transportation network, and which is loaded on a medium, is valid.

Reloadable cards, most often contactless, are generally used as media for these transportation entitlements. Since these are media intended for occasional users, this solution nevertheless has the drawback of representing a non-negligible cost for the operator, since the latter must provide the user with said reloadable cards.

To resolve this problem, public transportation network operators have tried to use a medium that is always in the user's possession as transportation entitlement medium. They have thus turned to smart phones, which have the advantage of already equipping a large number of users and having the security and contactless communication functions that make them terminals able to perform all of the functions of traditional media.

The solutions developed today to use smart phones as transportation entitlement media most often use near field communication (NFC). These solutions are managed by mobile telephone operators, who provide the terminals, infrastructure and billing system to the public transportation operator. They are disadvantageous in several ways. First, they only allow a very small number of users to use them, since not many smart phones are equipped with NFC chips. Furthermore, they make the public transportation operator dependent on mobile telephone operators, SIM card manufacturers, and mobile telephone manufacturers. The other solutions not using near field communication generally require permanent communication between the smart phone and a central server of the access control system, this communication being awkward when the user is moving through an area where the propagation of electromagnetic waves is poor, such as a subway station.

Also known from WO 2008/062179 is a method of checking the validity of a transportation entitlement, stored in the memory of a personal digital assistant, by a validator. This method comprises a step for capturing a datagram using a camera of the personal digital assistant, a step for extracting data from that datagram, and a step for encrypting a Bluetooth transmission between the validator and the personal digital assistant using extracted data.

One aim of the invention is to allow public transportation operators to do away with the need to provide a transportation entitlement medium for each user of their network. Other aims are to avoid making public transportation operators dependent on any other service provider, and to allow them to eliminate the need to provide a specific transportation entitlement medium for a large number of users of their network.

To that end, the invention relates to a method of the aforementioned type, characterized in that the encoded item of computer data is a unique identifier of the access control point, the method further including the following steps:

establishing a wireless connection between the mobile terminal and the access control point, by the mobile terminal, using the unique identifier of the decrypted access control point, sending the access control point, via the mobile terminal, an access entitlement to the reserve zone stored in its memory, via a wireless connection, and checking the validity of the data of said access entitlement by the access control point.

According to specific embodiments of the invention, the method also has one or more of the following features, considered alone or according to any technically possible combination(s).

The method comprises an additional step for updating the access entitlement via the access control point, in the memory of the mobile terminal, via a wireless connection.

The update step comprises a sub-step for incrementing a first counter comprised in the access entitlement, the method further comprising a step for storing a copy of said counter in a central server of the access control system.

The step for checking the validity of the data of the access entitlement via the access control point comprises a sub-step for checking the compliance of the value of the counter before incrementation with that of the copy of the counter saved on the central server, the data of the access entitlement only being declared valid if such compliance is verified.

The access entitlement comprises an expiration timestamp, and the step for checking the validity of the data of said access entitlement via the access control point comprises the following sub-steps: reading the expiration timestamp of the access entitlement, and comparing said expiration timestamp with the date-time of the moment of presentation of the mobile terminal at the access control point.

The method comprises a step for connecting the mobile terminal to the central server via the Internet, a step for checking the validity of the data of the access entitlement by the central server and, if the central server concludes that said data of the access entitlement is valid, a step for replacing the expiration timestamp of the access entitlement with a later expiration date-time.

The steps for checking the validity of the data of the access entitlement via the central server comprises a sub-step for checking the compliance of the value of the counter with that of the copy of the counter saved on the central server, the access entitlement only being declared valid if such compliance is verified.

The step for checking the validity of the data of the access entitlement via the central server comprises a sub-step for verifying the integrity of the data of the access entitlement, the access entitlement only being declared invalid if the integrity of said access entitlement is verified.

The step for checking the validity of the data of the access entitlement via the central server comprises a sub-step for performing a comparison between the first unique identifier comprised in the access entitlement and a second identifier specific to the mobile terminal, for example a MAC address of the mobile terminal, the access entitlement only being declared valid if the first and second identifiers match.

If the expiration timestamp is before the date-time of the presentation moment of the mobile terminal to the access control point, the access entitlement is declared invalid.

If the expiration timestamp is before the date-time of the presentation moment of the mobile terminal to the access control point, the access control point connects to the central server to check the compliance of the value of the counter before incrementation with that of the copy of the counter saved on the central server, the access entitlement only be declared valid if such compliance is verified.

The update step comprises a sub-step for time stamping the access entitlement.

The step for checking the validity of the data of the access entitlement via the access control point comprises a sub-step for verifying the integrity of the data of the access entitlement, the access entitlement only being declared invalid if the integrity of said access entitlement is verified.

The step for checking the validity of the data of the access entitlement via the access control point comprises a sub-step for performing a comparison between the first unique identifier comprised in the access entitlement and a second identifier specific to the mobile terminal, for example a MAC address of the mobile terminal, the access entitlement only being declared valid if the first and second identifiers match.

The access entitlement comprises a digital signature to verify its authenticity, said signature depending on an identifier specific to the mobile terminal, for example a MAC address of the mobile terminal.

The unique identifier is the MAC address of the access control point.

The image carried by the access control point is a barcode, in particular a two-dimensional barcode.

The wireless network is a Bluetooth network.

Figure 2:
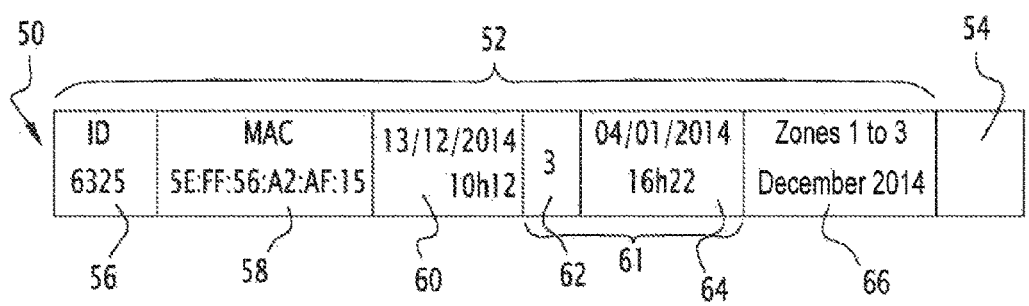
Figure 3:
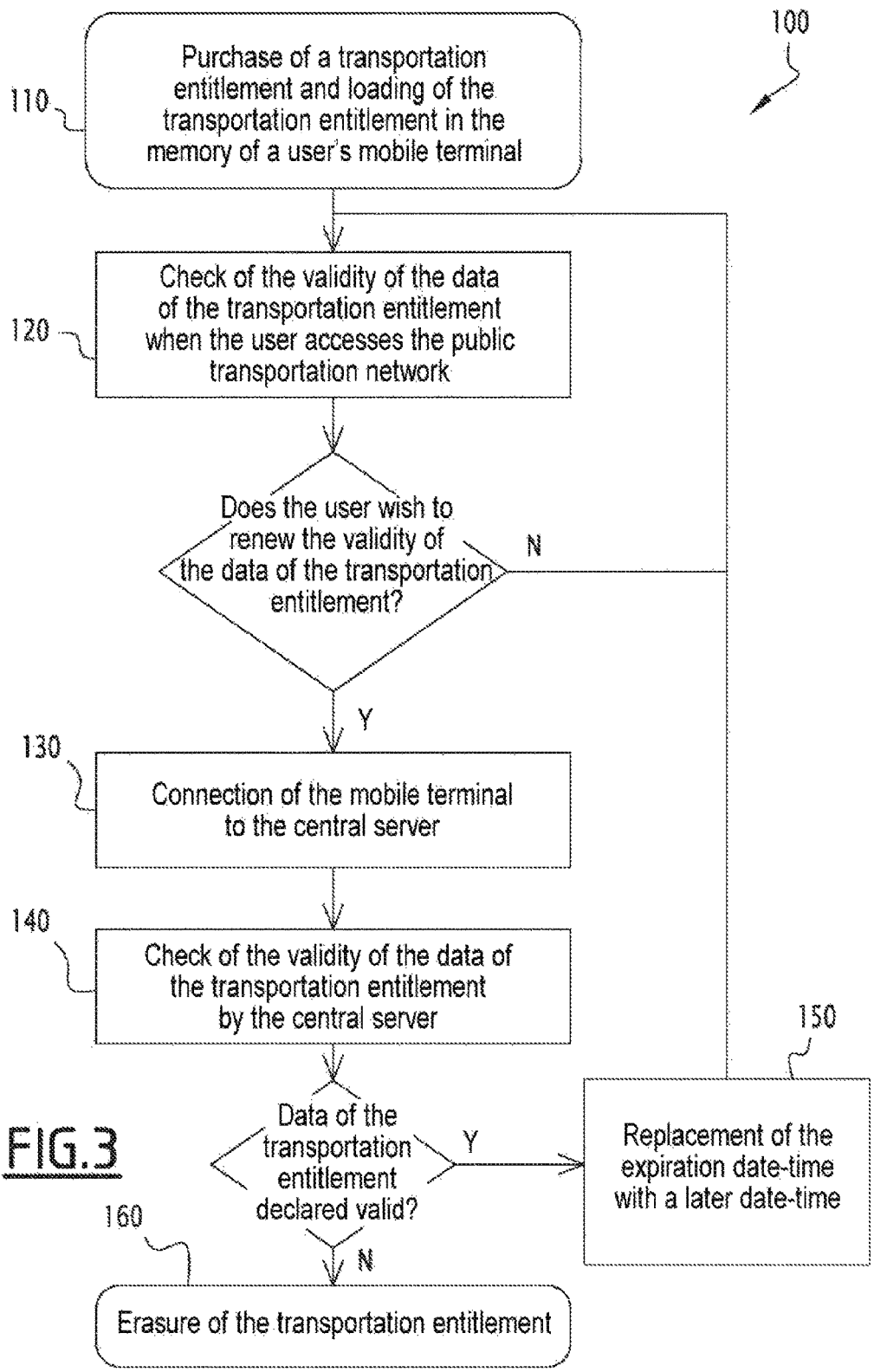
Figure 4:
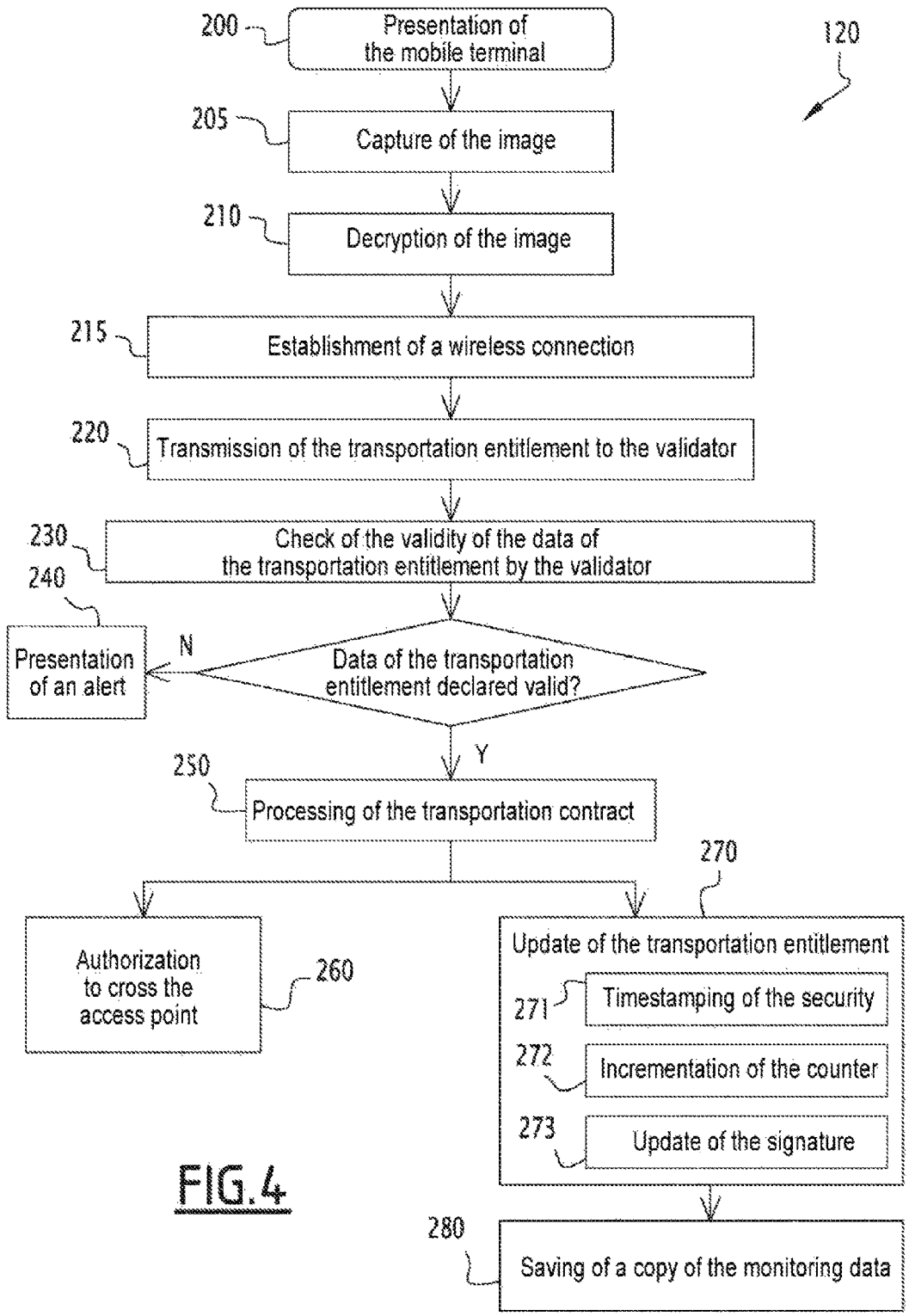
Figure 5:
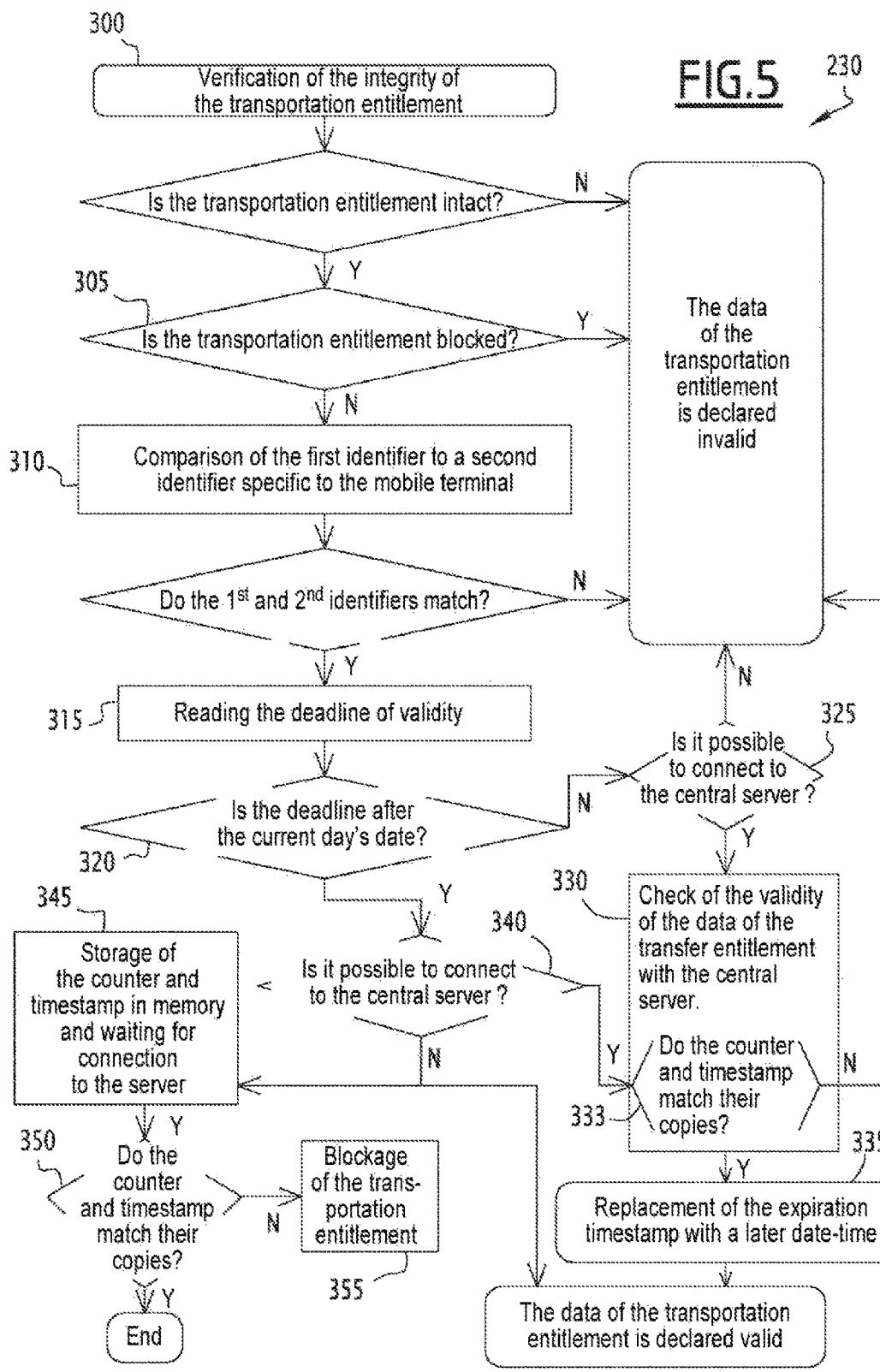
Figure 6:
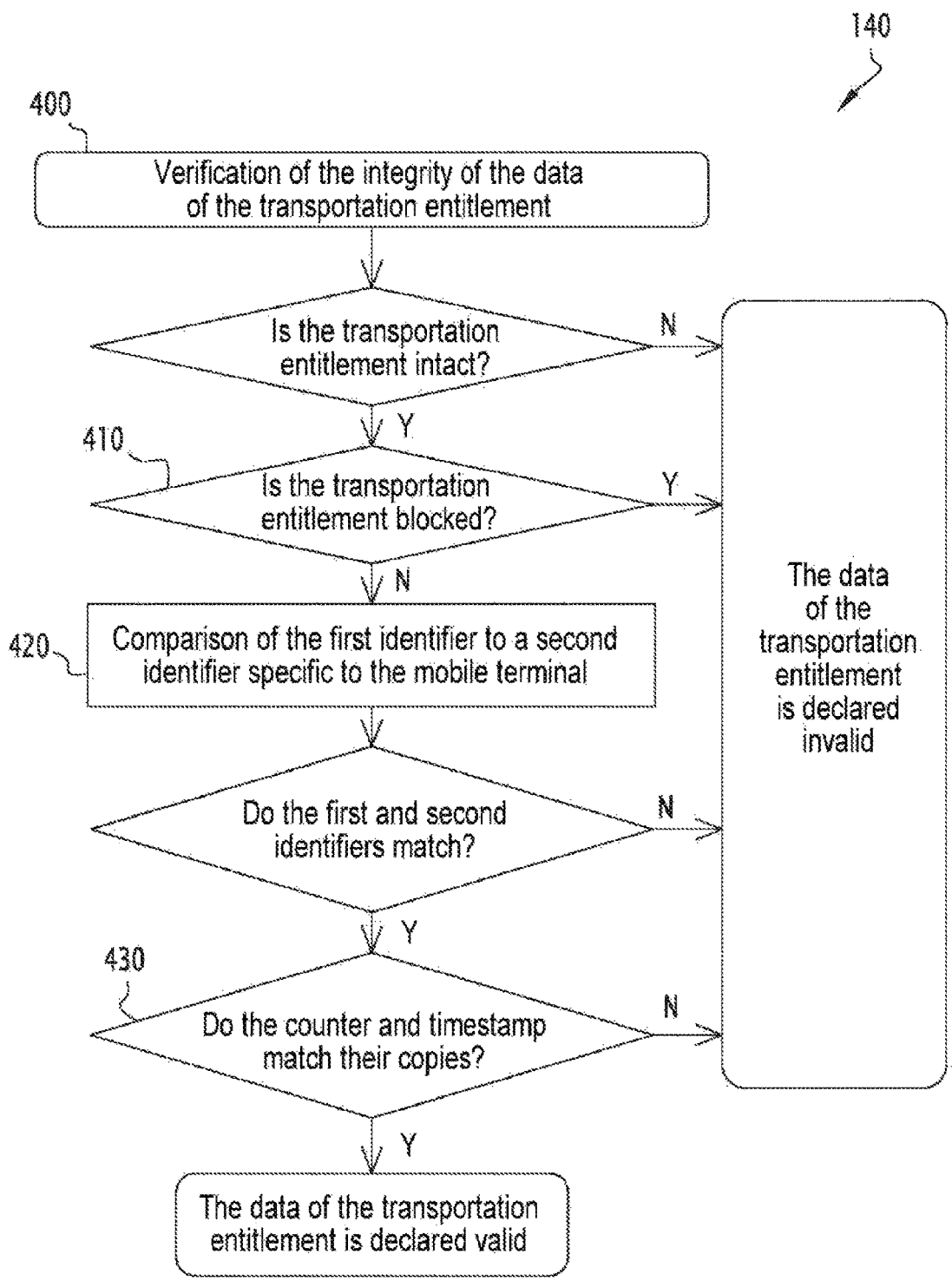

Other features and advantages of the invention will appear upon reading the following description, provided solely as an example and done in reference to the appended drawings, in which:

FIG. 1 is a diagrammatic view of a system for controlling access to a reserve zone and a mobile terminal for carrying out a method according to the invention, FIG. 2 is an illustration of a transportation entitlement stored in a memory of the mobile terminal of FIG. 1, FIG. 3 is a block diagram of an access control method according to the invention, FIG. 4 is a block diagram outlining the sub-steps of a first step for checking the validity of the data of an access entitlement of the method of FIG. 3, FIG. 5 is a block diagram outlining the sub-steps of a sub-step for checking the validity of the data of the access entitlement by an access control point of the step of FIG. 4, and FIG. 6 is a block diagram outlining the sub-steps of a second step for checking the validity of the data of the access entitlement of the method of FIG. 3.

The access control system 10 of FIG. 1 is intended to control access by users to a reserve zone, in particular to a public transportation network. To that end, the access control system 10 comprises, in a known manner, a central server 12 and a plurality of access control points 14. The access control system 10 further comprises means 16 for the communication of each access control point 14 with the central server 12.

The server 12 is connected to the Internet and suitable for communicating with mobile terminals via Internet to sell transportation entitlements intended to be loaded onto mobile terminals and to check the validity of the transportation entitlements loaded on said mobile terminals. To that end, the server 12 in particular comprises a memory (not shown) storing an identifier for each transportation entitlement sold.

Each access control point 14 is arranged at an entrance to the reserve zone, i.e., an entrance of one of the vehicles of the transportation network and/or an entrance to an access platform for one of said vehicles. Each access control point 14 comprises a validator 17, and preferably a gate or gantry controlling access to the transportation network (not shown), associated with the validator, to block access to the transportation network when the transportation entitlement presented to the validator 17 is not valid.

Each validator 17 comprises wireless communication means 20, for example a Bluetooth chip coupled to an antenna, for exchanging data between the validator 17 and other terminals via a wireless connection 22, typically a Bluetooth connection. According to the invention, each access control point 14 carries an image 24 representative of an encoded item of computer data, said encoded item of computer data being a unique identifier, in particular a unique network identifier, for example a MAC (Media Access Control) address, of the wireless communication means 20 of the validator 17 of said access control point 14.

In a known manner, a MAC address of an item of equipment is a physical identifier stored in a network card or a network interface of the item of equipment and used to assign a unique address to said item of equipment when the latter connects to a network via said network card or network interface.

In the illustrated example, the communication means 16 are wired communication means. Alternatively, the communication means 16 are wireless communication means and are preferably compatible with at least one of the following standards: GSM (Global System for Mobile Communications), CDMA (Code Division Multiple Access), UMTS (Universal Mobile Telecommunications System), LTE (Long Term Evolution) or Wi-Fi.

The mobile terminal 30 of FIG. 1 comprises first wireless communication means 32 compatible with the communication means 20, i.e., in the context of the example set out above, a Bluetooth chip coupled to an antenna. The mobile terminal 30 further comprises second wireless communication means 34, a camera 36, a memory 38, a SIM (Subscriber Identity Module) card 40 and a computer 42.

The second wireless communication means 34 carry the Internet protocol and are preferably compatible with at least one of the following standards: GSM, CDMA, UMTS, LTE or Wi-Fi.

The second memory 38 is preferably a rewritable memory. Its stores a transportation entitlement emulation application (not shown) that is programmed so that, when it is executed by the computer 42, it decrypts an image of the image 24 captured by the camera 36 so as to deduce the identifier of the validator 17 therefrom, and activates the first wireless communication means 32 so as to establish a wireless connection between the mobile terminal 30 and the validator 17, via the communication means 20, 32, using the decoded identifier. Said application is also programmed to allow the purchase of transportation entitlements from the server 12, and to save, in the memory 38, the transportation entitlements loaded on the terminal 30 by the server 12. Lastly, the application is programmed to send the transportation entitlements stored in the memory 38 to the validator 17 when a connection is established between the validator 17 and the terminal 30, and to save the updated transportation entitlements sent by the validator 17 in the memory 38, replacing the earlier versions of the transportation entitlements.

A transportation entitlement 50 is diagrammatically shown in FIG. 2.

As shown in this Figure, each transportation entitlement 50 comprises a data set 52 and a digital signature 54 of the data set 52.

The data set 52 comprises an identifier 56 of the transportation entitlement 50. It also comprises a first identifier 58 based on the mobile terminal 30 from which it was purchased. It further comprises an expiration timestamp 60 of the data 52, monitoring data 61 of the transportation entitlement, comprising a counter 62 and an expiration timestamp 64, and a transportation contract 66.

The identifier 56 is typically a contract number associated with the transportation entitlement 50. It is similar to the identifier stored in the server 12.

The first identifier 58 is for example the MAC address of the first wireless communication means 32 of the mobile terminal 30 with which the transportation entitlement 50 was purchased.

The counter 62 is suitable for being incremented by each validator 17 each time the transportation entitlement 50 is read by a validator 17.

The validation timestamp 64 is a date-time set corresponding to the last read moment of the transportation entitlement 50 by a validator 17.

The transportation contract 66 is, in a known manner, representative of an authorization to travel, over at least part of the transportation network, issued to the holder of the transportation entitlement 50. The transportation contract 66 is for example a contract providing unlimited access to part or all of the transportation network. Alternatively, the transportation contract 66 is a transportation contract of the "electronic wallet" type, representing a quantifiable datum and being suitable for being withdrawn from a certain quantity of said quantifiable datum upon each trip by the user on the network.

The signature 54 is obtained by applying an encryption key to the data set 52 or a hash of said data set 52.

The mobile terminal 30 is typically a smart phone.

The access control method 100 according to the invention, carried out using the system 10 and the mobile terminal 30, will now be described in reference to FIGS. 3 to 6.

As shown in FIG. 3, this method 100 comprises a first step 110 for purchasing a transportation entitlement 50 and loading the transportation entitlement 50 in the memory 38 of the mobile terminal 30. During this first step 110, the user who has the mobile terminal 30 launches the transportation entitlement emulation application. With this application, he purchases a virtual transportation entitlement 50 on the server 12. This transportation entitlement 50 is next downloaded on the mobile terminal 30, and stored in the memory 38 by the transportation entitlement emulation application.

The purchasing and loading step 110 is followed by a step 120 for checking the validity of the loaded transportation entitlement when the user accesses the public transportation network. This step occurs each time the user presents himself at a boundary of the public transportation network, i.e., at an entrance or exit of the public transportation network, to access or leave it.

The method 100 further comprises a step 130 for connecting the mobile terminal 30 to the central server 12 via Internet at regular time intervals or when the user wishes to renew the validity of the data of this transportation entitlement 50. This connection is established using connection means 34.

Step 130 is followed by a step 140 for checking the validity of the data of the transportation entitlement 50 via the central server 12. The method 100 further comprises a step 150 for replacing the expiration timestamp 60 with a later date-time when the data of the entitlement 50 is declared valid by the central server 12, and a step 160 for erasing the transportation entitlement 50 from the memory 38 of the mobile terminal 30 when the data of the entitlement 50 is declared invalid by the central server 12. Alternatively, the erasure step 160 is replaced by a step for sending a fine to the user.

In reference to FIG. 4, step 120 comprises a first step 200 for presenting the mobile terminal 30 to a validator 17, the card emulation application being active. This step is followed by a step 205 for capturing the image 24 via the camera 36 of the mobile terminal 30, then by a step 210 for decrypting the image 24 via the card emulation application.

The identifier of the validator 17 is thus deduced by the card emulation application, which, in a first step 215, uses this identifier to establish a direct wireless connection 22 between the mobile terminal 30 and the validator 17, via a wireless connection means 20 and 32.

Step 215 is followed by a step 220 for sending the transportation entitlement 50 to the validator 17, during which the card emulation application sends the transportation entitlement 50 to the validator 17, via a wireless connection 22.

Then, during step 230, the validator 17 checks the validity of the data of the transportation entitlement 50.

Step 120 further comprises a step 240 for presenting an alert when the data of the transportation entitlement 50 is declared invalid, and a step 250 for processing the transportation contract 66 when the data 52 of the transportation entitlements 50 is declared valid.

During step 240, the user and/or a body monitoring access to the public transportation network receives an alert. This alert is preferably a visual alert, and is for example displayed on the validator 17. Optionally, the visual alert is accompanied by a sound alert. Alternatively, the alert consists of a sound alert.

Optionally, access to the public transportation network is blocked concomitantly with step 240. This blockage consists of the non-opening or the closure of the access gate or gantry associated with the validator 17.

The processing step 250 is known and comprises the verification, by the validator 17, of the fact that the transportation contract 66 grants its holder authorization to enter or leave the network via the access control point 14. If the transportation contract 66 is of the "electronic wallet" type, the processing step 250 may also comprise the withdrawal, on the contract 66, of a quantity depending on the trip made by the user on the transportation network.

The processing step 250 is followed by a step 260 for authorizing crossing of the access control point 14 by the user and a step 270 for updating the transportation entitlement 50 in the memory 38 of the mobile terminal 30.

During step 260, the validator 17 communicates the information that the user is authorized to cross the access control point 14. This information is for example displayed on a screen of the validator 17. Preferably, an entry or exit passageway to or from the transportation network is simultaneously released by the movement of the gate or gantry associated with the validator 17 in the open position.

During step 270, the transportation entitlement 50 is updated by the validator 17 in the memory 38 of the mobile terminal 30, via the wireless connection 22. This step comprises a first sub-step 271 for timestamping the transportation entitlement 50, a second sub-step 272 for incrementing the counter 62, and a third sub-step 273 for updating the signature 54.

During the timestamping step 271, the validator 17 overwrites the timestamp 64 with the time and date of reading of the entitlement 50 by the validator 17.

During step 272, the validator 17 increments the counter 62 of the entitlement 50.

During step 273, the signature 54 is recalculated from the updated data 52.

Step 270 is followed by a step 280 for saving a copy of the monitoring data 61 in a memory of the central server 12. This step 280 occurs if the communication means 16 are available. If the communication means 16 are unavailable when the mobile terminal 30 is presented to the validator 17, the validator 17 defers the transmission of a copy of the monitoring data 61 to the server 12 while waiting for the communication means 16 to become available.

In reference to FIG. 5, step 230 for checking the validity of the data of the transportation entitlement 50 by the validator 17 comprises a first step 300 for verifying the integrity of the transportation entitlement 50. During this step, the validator 17 verifies, through known means, that the signature 54 indeed corresponds to the data 52. If this match is verified, the validator 17 declares the data of the transportation entitlement 50 intact. Otherwise, the validator 17 declares the data of the transportation entitlement 50 invalid.

Step 305 for checking the blockage of the transportation entitlement 50 takes place after step 300 if the data of the transportation entitlement 50 is declared intact. During this step 305, the validator 17 verifies that the identifier 56 of the transportation entitlement 50 does not appear in the list of blocked transportation entitlements. If the identifier 56 appears on said list, the validator 17 declares the data of the transportation entitlement 50 invalid. Otherwise, the validator 17 concludes that the transportation entitlement 50 is not blocked.

A step 310 for comparing the first identifier 58 to a second identifier specific to the mobile terminal 30 takes place after step 305 if the validator 17 concludes that the transportation entitlement 50 is not blocked. During this step 310, the validator 17 compares the first identifier 58 to a second identifier specific to the mobile terminal 30, for example to a unique network identifier, typically made up of the MAC address, of the connection means 32. If these identifiers are different from one another, the validator 17 declares the data of the transportation entitlement 50 invalid. If the two identifiers match, the validator 17 goes on to a new step 315.

Step 315 is a step for reading the expiration timestamp 60. It is followed by a step 320 for comparing the expiration timestamp 60 to the date-time of presentation of the mobile terminal 30 to the validator 17.

If the expiration timestamp 60 is earlier than the date-time of presentation of the mobile terminal 30 to the validator 17, the validator 17 verifies, during a step 325, whether it can connect to the central server 12. If this connection is impossible, the validator 17 declares the transportation entitlement 50 invalid. If this connection is possible, the validator 17 queries the central server, during a step 330, to check the validity of the data of the transportation entitlement 50 with the central server 12; this checking sub-step 330 comprises a step 333 for checking the compliance of the timestamp 64 and the counter 62 with copies of the timestamp 64 and the counter 62 stored on the server 12.

If the timestamp 64 and/or the counter 62 are not equal to their respective copies, the validator 17 declares the data of the transportation entitlement 50 invalid. Otherwise, the expiration timestamp 60 is replaced, during a step 335, by a later expiration date-time, and the data of the transportation entitlement 50 is declared valid.

If the expiration timestamp 60 is later than the date-time of the presentation moment of the mobile terminal 30 to the validator 17, the validator 17 preferably verifies, during a step 340, whether it can connect to the central server 12. If this connection is possible, the validator 17 proceeds with step 330 described above. If this connection is not possible, the validator 17 declares the data of the transportation entitlement 50 valid and, during a step 345, places the timestamp 64 and the counter 62 in memory and waits for the communication means 16 to become available.

Next, when the communication means 16 are available, the validator 17 provides the central server 12 with the stored timestamp 64 and counter 62. During a step 350, the server 12 checks the compliance of the timestamp and the counter 62 with the copies of the timestamp 64 and counter 62 that it has stored. If the timestamp 64 and/or the counter 62 are not equal to their respective copies, the server 12 commands the blockage of the transportation entitlement 50 during a step 355. To that end, the server 12 records the identifier 56 of the transportation entitlement 50 on the list of blocked transportation entitlements, and communicates the updated list to each validator 17 of the system 10.

Alternatively, the blockage step 355 is replaced by a step for sending a fine to the user.

In reference to FIG. 6, step 140 for checking the validity of the data of the transportation entitlement 50 by the central server 12 comprises a first sub-step 400 for verifying the integrity of the data of the transportation entitlement 50. Step 140 further comprises a sub-step 410 for checking the blockage of the transportation entitlement 50, a step 420 for comparing the first identifier 58 to a second identifier specific to the mobile terminal 30, and a sub-step 430 for checking the compliance of the timestamp 64 and the counter 62 with copies of the timestamp 64 and counter 62 stored on the server 12.

During this step 400, the central server 12 verifies, through known means, that the signature 54 indeed corresponds to the data 52. If this match is verified, the central server 12 declares the transportation entitlement 50 intact and proceeds with step 410. Otherwise, the central server 12 declares the transportation entitlement 50 invalid.

During step 410, the central server 12 verifies that the identifier 56 of the transportation entitlement 50 does not appear in the list of blocked transportation entitlements. If the identifier 56 appears on said list, the central server 12 declares the transportation entitlement 50 invalid. Otherwise, the central server 12 concludes that the transportation entitlement 50 is not blocked and proceeds with step 420.

During step 420, the central server 12 compares the first identifier 58 to a second identifier specific to the mobile terminal 30, for example to a unique network identifier, typically made up of the MAC address, of the connection means 32. If these identifiers are different from one another, the central server 12 declares the transportation entitlement 50 invalid. If the two identifiers match, the central server 12 proceeds with step 430.

During step 430, the central server compares the timestamp 64 and counter 62 to the timestamp and counter associated with the transportation entitlement 50 stored on the server 12. If the timestamp 64 and/or the counter 62 are not equal to their respective copies stored on the server 12, the central server 12 declares the data of the transportation entitlement 50 invalid. Otherwise, the central server 12 declares the data of the transportation entitlement 50 valid.

Owing to the invention described above, public transportation operators can do away with the need to provide a transportation entitlement medium specific to each user of their network, the mobile terminal of some of these users being able to replace such a specific medium.

Furthermore, inasmuch as the user's mobile terminal needs only have a camera and wireless communication means, a large number of existing mobile terminals may be able to be used to carry out the invention. Operators will therefore be able to eliminate the need to provide a specific transportation entitlement medium for a large number of users of their network.

Additionally, only an occasional communication of the mobile terminal 30 with the central server 12 being necessary, the method 100 is particularly suitable for use in places where the propagation of electromagnetic waves is poor, such as subway stations.

Furthermore, the method 100 offers good protection against fraud attempts. It is in fact difficult for a fraudulent operator to duplicate the transportation entitlement 50 for a user on another mobile terminal 30, inasmuch as the identifier 58 would then no longer correspond to the specific identifier of the mobile terminal 30 on which the transportation entitlement 50 would be loaded. Fraud by playback is also prevented, inasmuch as the timestamp 64 and the counter 62 carried by the transportation entitlement 50 would then no longer correspond to their copies stored in the memory of the server 12.

Lastly, the method 100 may be carried out with great independence with respect to mobile telephone operators, SIM card suppliers and mobile telephone manufacturers, such that public transportation operators do not risk becoming dependent on these service providers.

It will be noted that, in the method 100 described above, steps 230 and 140 for checking the integrity of the transportation entitlement 50 by the validator 17 and the central server 12 each comprise a sub-step 310, 420, respectively, for comparing the first identifier 58 to a second identifier specific to the mobile terminal 30. In another alternative of the invention (not shown), the transportation entitlement 50 does not comprise the first identifier 58, and the sub-steps 310, 420 are omitted; the signature 54 of the transportation entitlement 50 is then calculated using an identifier specific to the mobile terminal 30 with which the transportation entitlement 50 was purchased, for example a unique network identifier of the mobile terminal 30, typically made up of the MAC address of the first communication means 32 of said mobile terminal 30.

It will also be noted that, in the method described above, the transportation entitlement 50 is saved in an unsecured memory 38 of the mobile terminal 30. In another alternative of the invention (not shown), the transportation entitlement 50 is saved in a secure memory of the mobile terminal 30, for example the memory of the SIM card 40 or the memory of an encrypted SD (Secure Digital) card, and the wireless connection established between the mobile terminal 30 and the validator 17 during step 215 is an encrypted connection.

It will lastly be noted that, although the invention has been described in the context of controlling access to public transportation networks, it is not limited to only this field, and more broadly relates to all systems for controlling access to reserve zones.

The invention claimed is:

1. A method of controlling access to a reserve zone via a system for controlling access to the reserve zone, the method comprising the following steps:
   presenting a mobile terminal to an access control point of the access control system, at a presentation moment having a presentation date-time,
   capturing an image carried by the access control point, representative of an encoded item of computer data, using a camera of the mobile terminal, and
   decrypting, via the mobile terminal, the image captured by the camera, to deduce the encoded computer data therefrom,
   wherein the encoded item of computer data is a unique identifier of the access control point, and the method further comprises the following steps:
   establishing a wireless connection between the mobile terminal and the access control point, by the mobile terminal, using the unique identifier of the access control point,
   sending the access control point, via the mobile terminal, an access entitlement to the reserve zone stored in its memory, via a wireless connection, the access entitlement comprising an expiration timestamp and a transportation contract,
   first check of the validity of the data of said access entitlement by the access control point, said check comprising the following sub-steps:
     reading the expiration timestamp of the access entitlement, and
     comparing said expiration timestamp with the presentation date-time,
   second check of the validity of the data of the access entitlement, and
   if it is concluded that said data of the access entitlement is valid as part of the second check, replacing the expiration timestamp of the access entitlement with a later expiration date-time.

2. The access control method according to claim 1, comprising an additional step for updating the access entitlement via the access control point, in the memory of the mobile terminal, via a wireless connection.

3. The access control method according to claim 2, wherein the update step comprises a sub-step for time stamping the access entitlement.

4. The access control method according to claim 2, wherein the update step comprises a sub-step for incrementing a first counter comprised in the access entitlement, the method further comprising a step for storing a copy of said counter in a central server of the access control system.

5. The access control method according to claim 4, wherein the second check of the validity of the data of the access entitlement comprises a sub-step for checking the compliance of the value of the counter before incrementation with that of the copy of the counter saved on the central server, the data of the access entitlement only being declared valid if such compliance is verified.

6. The access control method according to claim 1, comprising a step for connecting the mobile terminal to the central server via the Internet, the second check of the validity of the data of the access entitlement being done by the central server.

7. The access control method according to claim 6, wherein the second check of the validity of the data of the access entitlement comprises a sub-step for verifying the integrity of the data of the access entitlement, the access entitlement only being declared invalid if the integrity of said access entitlement is verified.

8. The access control method according to claim 6, wherein the second check of the validity of the data of the access entitlement comprises a sub-step for performing a comparison between a first unique identifier comprised in the access entitlement and a second identifier specific to the mobile terminal, the access entitlement only being declared valid if the first and second identifiers match.

9. The access control method according to claim 1, wherein, if the expiration timestamp is before the date-time of the presentation moment of the mobile terminal to the access control point, the access entitlement is declared invalid.

10. The access control method according to claim 1, wherein, if the expiration timestamp is before the date-time of the presentation moment of the mobile terminal to the access control point, the access control point performs the second check of the validity of the data of the access entitlement.

11. The access control method according to claim 1, wherein the first check of the validity of the data of the access entitlement comprises a sub-step for verifying the integrity of the data of the access entitlement, the access entitlement only being declared invalid if the integrity of said access entitlement is verified.

12. The access control method according to claim 1, wherein the first check of the validity of the data of the access entitlement comprises a sub-step for performing a comparison between a first unique identifier comprised in the access entitlement and a second identifier specific to the mobile terminal, the access entitlement only being declared valid if the first and second identifiers match.

13. The access control method according to claim 7, wherein the access entitlement comprises a digital signature to verify its integrity, said signature depending on an identifier specific to the mobile terminal.

14. The access control method according to claim 11, wherein the access entitlement comprises a digital signature to verify its integrity, said signature depending on an identifier specific to the mobile terminal.

* * * * *